3,657,269
IMIDAZO[2,1-a]ISOINDOLES
William J. Houlihan, Mountain Lakes, N.J., assignor to Sandoz-Wander, Inc., Hanover, N.J.
No Drawing. Continuation-in-part of application Ser. No. 825,954, May 19, 1969. This application Oct. 9, 1969, Ser. No. 865,179
Int. Cl. C07d 49/36
U.S. Cl. 260—309.6
6 Claims

ABSTRACT OF THE DISCLOSURE

Imidazo[2,1-a]isoindoles useful as anorexics and psychic-energizers are prepared from the N,o-dilithium derivative of 2-phenylimidazoline by various routes.

---

This application is a continuation-in-part of application Ser. No. 825,954, filed May 19, 1969 now abandoned.

This invention relates to the preparation of imidazo-[2,1-a]isoindoles of the formula

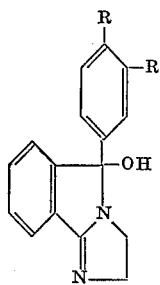

(I)

where each R, independently, represents H or halo having an atomic weight of 19-36. These compounds are known to be useful as anorexics and psychic-energizers.

The compounds of Formula I may also be represented by the tautomeric form (II)

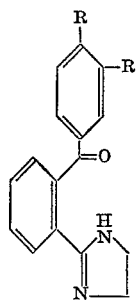

(II)

where R is as above defined. To simplify this disclosure, only the compounds of Formula I are to be discussed, but both tautomeric forms are included in the content of this invention.

The compounds (I) may be prepared by treating the N,o-dilithiated derivative of 2-phenylimidazoline

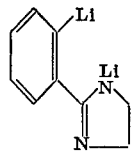

(III)

with a compound of the formula

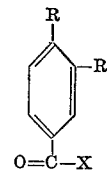

(IV)

where each R is as earlier defined, and X represents halo having an atomic weight of about 35-80, or $OR_1$, where $R_1$ represents straight chain loweralkyl, i.e., straight chain alkyl of 1-4 carbon atoms, such as methyl, ethyl and propyl, and hydrolyzing the resulting adduct.

This process is conducted by treating (III) with (IV) in inert atmosphere, such as nitrogen gas, and inert solvent such as a hydrocarbon, for example, hexane or heptane, or an ether, e.g., diethyl ether or tetrahydrofuran at a temperature of about 0°–100° C., preferably at about room temperature to the reflux temperature of the system, for about 0.5 to about 48 hours. The hydrolysis may be performed in conventional manner using, e.g. water, dilute mineral acid, ammonium chloride solution, and the like.

The compounds (I) are also preparable from the compounds of Formula III by treating the latter with a nitrile of the formula

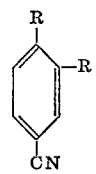

(V)

and hydrolyzing the resulting adduct, to obtain a compound of Formula VI

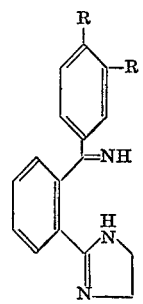

(VI)

where R is as earlier defined, and treating (VI) (or an acid addition salt thereof) with water in the presence of acid. Accordingly, compounds (VI) may be prepared by treating (III) and (V) using the same reaction conditions, i.e., temperature, atmosphere, solvents and conventional hydrolysis, as earlier described with reference to the preparation of compounds (I) from compounds (III) and (IV). The compounds (VI) or a salt thereof are then treated with dilute aqueous acid, such as a dilute aqueous strong mineral acid, such as hydrochloric acid, sulfuric acid, phosphoric acid, or the like, or a dilute aqueous organic acid such as dilute aqueous acetic acid, at a temperature of about room temperature to about 50° C. to about 2-24 hours. The pH is 1-4.

The compound (VI) may also be represented by its tautomer

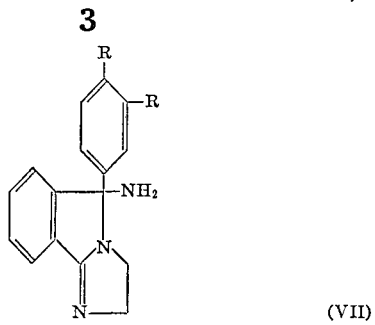

(VII)

where R is as previously defined. Both tautomeric forms are within the scope of this invention and reference herein to one is intended to also be reference to the other. The particular tautomeric form present and the relative amounts of each will depend upon environmental factors such as pH and solvent.

These compounds (VI) and (VII) are new and novel and they represent an additional aspect of this invention. Moreover, the compounds form acid addition salts such as the mineral acid addition salts, e.g. the hydrobromide, hydrochloride, sulfate, phosphate, and the like, or organic acid salts such as the p-toluenesulfonate, acetate, benzoate and the like. These salts also represent an aspect of the invention.

In none of the above processes is the solvent, temperature or time of reaction critical in obtaining the indicated product. All these products are recovered by use of conventional techniques.

The compounds of Formula I are useful because they possess pharmacological activity in animals. In particular, they possess appetite depressant activity as indicated by their activity in rat given 25 mg./kg. of active agent and tested by use of the free-feeding method described by Randall, et al. (J. Pharmacol. Exp. Ther., 129, 163, 1960) whereby 16 groups of six male Wister rats are deprived of food for 18 hours but receive water ad libitum. Consumption of ground food is then measured over a four hour period following oral administration of the agent tested. Accordingly, these compounds may be used as anorexigenic agents. The compounds of this invention also possess central nervous system stimulant activity and can be used as psychic energizers as indicated by their activity in mouse given 12.5 mg./kg. of active compound and tested by use of a 30 word adjective check sheet method basically as described by Irwin, S. (Gordon Research Conference, Medicinal Chemistry, 1959), and Chen (Symposium on Sedative and Hypnotic Drugs, Williams and Wilkins, 1954).

For the above-mentioned uses, the dosage administered will, of course, vary depending upon the mode of administration and treatment desired. However, in general, satisfactory results are obtained for each of the above-mentioned uses when the compounds are administered at a daily dosage of from about 0.02 milligram to about 25 milligrams per kilogram of animal body weight, preferably given in divided doses, 2 to 4 times a day, or in sustained release form. For most large mammals the daily dosage is generally in the range of from about 1 milligram to about 25 milligrams, and dosage forms suitable for internal administration comprise from about 0.25 milligram to about 12.5 milligrams of the compound admixed with a solid or liquid pharmaceutical carrier or diluent.

The dilithio derivative of 2-phenylimidazoline (III) is obtained by treating 2-phenylimidazoline in inert atmosphere, e.g., nitrogen gas, and inert solvent, e.g., tetrahydrofuran, at a temperature of about 30°–100° C. for about 0.5–2.5 hours.

Some of the compounds of Formulas IV and V are known and may be prepared according to methods disclosed in the literature. Those compounds of Formulas IV and V not specifically disclosed in the literature may be prepared using analogous methods and known compounds.

The following examples are for the purpose of illustration only and are not intended as in any way limiting the invention defined in the appended claims.

EXAMPLE 1

5-(p-chlorophenyl)-5-hydroxy-2,3-dihydro-5H-imidazo-[2,1-a]isoindole

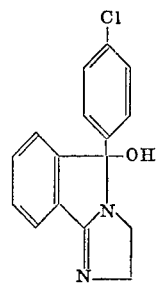

To a flask equipped with a stirrer, condenser, and dropping funnel maintained under a nitrogen atmosphere, is charged 7.3 g. (0.05 mole) of 2-phenylimidazoline and 100 ml. of dry tetrahydrofuran. Over a 15 minute period and with stirring, 94 ml. of 1.6 m. n-butyllithium in hexane (0.15 mole of n-butyllithium) is added. The suspension is stirred for about 24 hours at room temperature to provide the N,o-dilithium derivative of 2-phenylimidazoline. A solution of 20.6 g. (0.15 mole) of 4-chlorobenzonitrile in 50 ml. of tetrahydrofuran is added and the mixture is refluxed for 2.5 hours, cooled in an ice bath and treated with 50 ml. of water. The organic layer is separated and concentrated in vacuo. The resultant residue which is a mixture of unreacted 4-chlorobenzonitrile, 2-phenylimidazoline and 5-amino-5-p-chlorophenyl-2,3-dihydro-5H-imidazo[2,1-a]isoindole is treated with 150 ml. of 10% aqueous hydrochloric acid at 50° C. for 16 hours. The resultant mixture is cooled in an ice bath with 2 N sodium hydroxide until basic to litmus. The resultant solid is filtered off and crystallized from methanol-tetrahydrofuran (1:1) to give 5-(p-chlorophenyl)-5-hydroxy - 2,3-dihydro-5H-imidazo[2,1-a]isoindole; M.P. 198°–200° C.

When the above process is carried out and 3,4-dichlorobenzonitrile or 3-fluorobenzonitrile is used in place of 4-chlorobenzonitrile, there is obtained 5-(3,4-dichlorophenyl)-5-hydroxy - 2,3 - dihydro - 5H - imidazo[2,1-a]isoindole (M.P. 200°–201° C.), or 5-(3-fluorophenyl)-5-hydroxy - 2,3 - dihydro - 5H - imidazo[2,1-a]isoindole (M.P. 200°–203° C.), respectively.

EXAMPLE 2

5-(p-chlorophenyl)-5-hydroxy-2,3-dihydro-5H-imidazo[2,1-a]isoindole

To a flask equipped with a stirrer, condenser, and dropping funnel maintained under a nitrogen atmosphere, is charged 7.3 g. (0.05 mole) of 2-phenylimidazoline and 100 ml. dry diethylether. Over a 15 minute period and with stirring, 94 ml. of 1.6 m. n-butyllithium in hexane (0.15 mole of n-butyllithium) is added. The suspension is stirred for about 24 hours at room temperature to provide the N,o-dilithium derivative of 2-phenylimidazoline. The N,o-dilithium reagent is cooled in an ice bath to internal temperature of 10±5° C. and treated dropwise with 19.1 g. (0.11 mole) of 4-chlorobenzoylchloride in 75 ml. of diethyl ether. The reaction mixture is stirred for 6 hours at room temperature, then cooled in an ice bath and treated with 25 ml. of saturated ammonium chloride solution. The ether layer is separated and washed with 50 ml. of 2 N potassium hydroxide, dried with magnesium sulfate, filtered, and concentrated in vacuo. The residue is crystallized from methanol-tetrahydrofuran (1:1) to give 5-(p-chlorophenyl) - 5 - hydroxy - 2,3 - dihydro-5H-imidazo[2,1-a]isoindole; M.P. 198°–200° C.

When the above process is carried out and methyl 3,4-dichlorobenzoate or methyl 3-fluorobenzoate is used in place of 4-chlorobenzoylchloride, there is obtained 5-(3,4-dichlorophenyl)-5-hydroxy - 2,3 - dihydro - 5H - imidazo-[2,1-a]isoindole (M.P. 200°–201° C. or 5-(3-fluorophenyl)-5-hydroxy - 2,3 - dihydro-5H-imidazo[2,1-a]isoindole (M.P. 200°–203° C.), respectively.

What is claimed is:

1. A process for preparing a compound of the formula

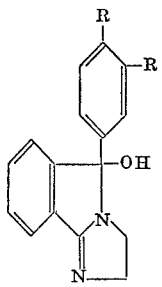

which may also be represented by the following tautomeric form

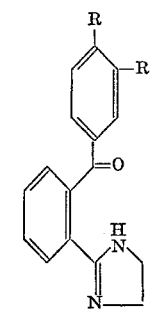

where each R, independently, represents H or halo having an atomic weight of 19–36, which comprises treating a compound of the formula

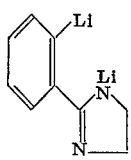

with a compound of the formula

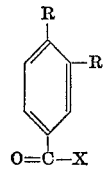

in inert atmosphere and inert solvent at a temperature of about 0°–100° C., where R is as earlier defined, and X represents halo having an atomic weight of about 35–80, or OR₁, where R₁ is straight chain loweralkyl, and hydrolyzing the resulting adduct.

2. A process according to claim 1 wherein

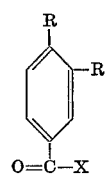

represents 4-chlorobenzoylchloride.

3. A process for preparing a compound which in the acid free form is of the formula

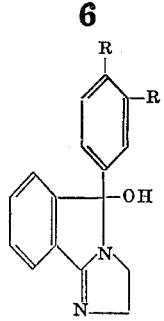

which may also be represented by the following tautomeric form

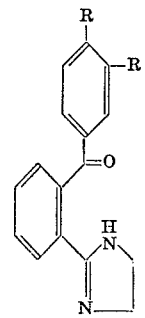

which comprises treating a compound of the formula

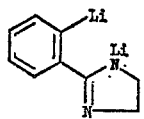

with a compound of the formula

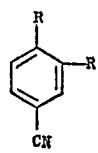

in inert atmosphere and inert solvent at a temperature of about 0°–100° C. and hydrolyzing the resulting adduct to obtain a compound of the formula

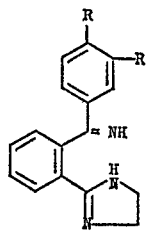

and treating the latter or an acid addition salt thereof with dilute aqueous acid at pH 1–4, where R, independently, represents H or halo having an atomic weight of 19–36.

4. A process according to claim 3 wherein

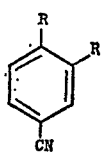

represents 4-chlorobenzonitrile.

5. A process for preparing a compound which in the acid free form is of the formula

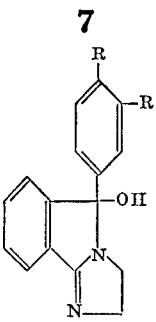

which may also be represented by the following tautomeric form

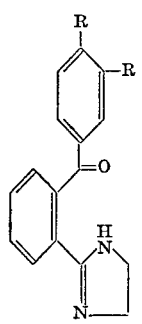

which comprises treating a compound of the formula

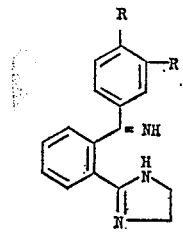

or an acid addition salt thereof with dilute aqueous acid at pH 1-4, where R is as defined in claim 3.

6. A compound of the formula

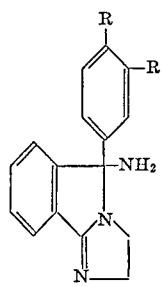

which may also be represented by the following tautomeric form

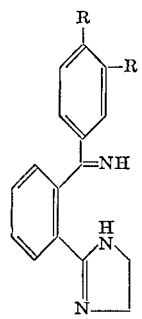

where each R, independently, represents H or halo having an atomic weight of 19–36.

References Cited

Betrabet et al., Chem. Abstr. vol. 25, pp. 701–2 (1931).
Metlesics et al., J. Org. Chem. vol. 33, pp. 2874–7 (1968, July 1968).

NATALIE TROUSOF, Primary Examiner

U.S. Cl. X.R.

260—999